(12) United States Patent
Frasure et al.

(10) Patent No.: US 9,649,520 B2
(45) Date of Patent: May 16, 2017

(54) BURST DISC PUNCTURE PRESSURE-IMBALANCE ACTUATOR FOR A FIRE EXTINGUISHER

(71) Applicant: Kidde Technologies, Inc., Wilson, NC (US)

(72) Inventors: David Frasure, Wilson, NC (US); John Wright Porterfield, Jr., Raleigh, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 0 days.

(21) Appl. No.: 14/328,794

(22) Filed: Jul. 11, 2014

(65) Prior Publication Data
US 2016/0008646 A1  Jan. 14, 2016

(51) Int. Cl.
*A62C 3/08* (2006.01)
*A62C 13/62* (2006.01)
(Continued)

(52) U.S. Cl.
CPC .............. *A62C 37/46* (2013.01); *A62C 3/08* (2013.01); *A62C 13/64* (2013.01); *A62C 35/02* (2013.01);
(Continued)

(58) Field of Classification Search
CPC ......... A62C 37/46; A62C 37/10; F16K 17/14; F16K 17/16; F16K 17/40; F16K 17/403; F16K 17/02
(Continued)

(56) References Cited

U.S. PATENT DOCUMENTS 1,918,191 A    7/1933  Paulus et al.
3,948,540 A *  4/1976  Meacham ............. B60R 21/272
                                                    137/70
(Continued)

FOREIGN PATENT DOCUMENTS

DE    GB 2241562 A  *  9/1991  ............. A62C 37/46
EP    2586498            5/2013
(Continued)

OTHER PUBLICATIONS

EP Application No. 15175180.7 Extended European Search Report dated Dec. 1, 2015, 9 pages.
(Continued)

*Primary Examiner* — Arthur O Hall
*Assistant Examiner* — Joseph A Greenlund
(74) *Attorney, Agent, or Firm* — Cantor Colburn LLP (57) ABSTRACT

According to one aspect, a fire extinguisher actuator assembly for a fire extinguisher is provided. The fire extinguisher includes a fire extinguisher reservoir and a burst disc that forms a discharge barrier between the fire extinguisher reservoir and a discharge head to retain a pressurized fire extinguishing agent within the fire extinguisher reservoir. The fire extinguisher actuator assembly includes a cutter shuttle assembly having a cutter coupled to a shuttle body. The cutter shuttle assembly is detained within the fire extinguisher proximate the burst disc and biased to form a pressure equalization region between the shuttle body and the burst disc. The fire extinguisher actuator assembly also includes an activation device having a piercing member operable to pierce the burst disc and release pressure from the pressure equalization region, thereby driving the cutter through the burst disc to release the pressurized fire extinguishing agent through the discharge head.

15 Claims, 9 Drawing Sheets

(51) Int. Cl.
*A62C 37/14* (2006.01)
*F16K 17/40* (2006.01)
*F16K 17/02* (2006.01)
*F16K 17/14* (2006.01)
*A62C 37/46* (2006.01)
*A62C 13/64* (2006.01)
*A62C 35/02* (2006.01)

(52) U.S. Cl.
CPC .............. *F16K 13/04* (2013.01); *F16K 17/02* (2013.01); *F16K 17/14* (2013.01); *F16K 17/40* (2013.01); *F16K 17/403* (2013.01)

(58) Field of Classification Search
USPC ........ 169/46, 6, 30, 71, 72, 75, 88; 239/271, 239/272; 137/68.19, 21, 22, 23, 28, 3
See application file for complete search history.

(56) References Cited

U.S. PATENT DOCUMENTS

| | | | |
|---|---|---|---|
| 4,492,103 A | 1/1985 | Naumann | |
| 4,596,289 A * | 6/1986 | Johnson | B05B 15/10 169/37 |
| 4,830,052 A * | 5/1989 | Oberlin | F16K 17/1626 137/68.24 |
| 5,010,911 A | 4/1991 | Grant | |
| 5,230,531 A * | 7/1993 | Hamilton | B60R 21/272 222/5 |
| 5,458,202 A * | 10/1995 | Fellows | A62C 37/46 169/20 |
| 5,462,307 A * | 10/1995 | Webber | B60R 21/272 222/5 |
| 5,676,190 A * | 10/1997 | Matsumoto | A62C 13/62 169/71 |
| 5,918,681 A * | 7/1999 | Thomas | A62C 3/07 169/61 |
| 6,076,610 A * | 6/2000 | Zwergel | A62C 13/68 169/28 |
| 6,164,383 A * | 12/2000 | Thomas | A62C 37/36 169/26 |
| 6,182,698 B1 * | 2/2001 | Barak | F16K 15/147 137/512 |
| 6,189,624 B1 * | 2/2001 | James | A62C 13/74 169/61 |
| 6,394,188 B1 * | 5/2002 | Zwergel | A62C 13/68 169/62 |
| 6,991,005 B2 | 1/2006 | Fedeli | |
| 7,140,381 B2 * | 11/2006 | Sundholm | A62C 35/023 137/68.13 |
| 7,281,672 B2 * | 10/2007 | Karalis | A62C 35/13 239/10 |
| 7,562,670 B1 | 7/2009 | Jones et al. | |
| 7,703,471 B2 * | 4/2010 | Edwards | F16K 17/403 137/68.3 |
| 8,448,716 B2 * | 5/2013 | Yoshida | A62C 13/76 137/68.3 |
| 8,511,397 B2 * | 8/2013 | Frasure | A62C 37/04 169/60 |
| 8,714,175 B2 * | 5/2014 | Fetner | B01D 11/0203 137/1 |
| 9,038,742 B2 * | 5/2015 | Porterfield, Jr. | A62C 37/40 169/46 |
| 9,153,400 B2 * | 10/2015 | Frasure | G08B 17/04 |
| 9,302,128 B2 * | 4/2016 | Dunster | A62C 13/003 |
| 2006/0131034 A1 * | 6/2006 | Lahouati | A62C 13/76 169/30 |
| 2010/0154600 A1 | 6/2010 | Gui et al. | |
| 2012/0043096 A1 | 2/2012 | Butz et al. | |
| 2013/0098639 A1 * | 4/2013 | Dunster | A62C 13/003 169/9 |
| 2013/0186654 A1 * | 7/2013 | Dunster | A62C 37/36 169/62 |
| 2013/0240221 A1 | 9/2013 | Chaney et al. | |
| 2015/0107685 A1 * | 4/2015 | Porterfield | F16K 1/30 137/70 |
| 2016/0008647 A1 * | 1/2016 | Frasure | A62C 37/46 169/16 |
| 2016/0008648 A1 * | 1/2016 | Frasure | A62C 37/46 169/16 |

FOREIGN PATENT DOCUMENTS

| | | |
|---|---|---|
| GB | 1567895 | 5/1980 |
| GB | 2048062 | 12/1980 |
| GB | 2241562 | 9/1991 |
| GB | 2466659 | 7/2010 |
| JP | H08238330 | 9/1996 |
| WO | 0147603 | 7/2001 |
| WO | 03089065 | 10/2003 |

OTHER PUBLICATIONS

EP Application No. 15176050.1 Extended European Search Report dated Dec. 1, 2015, 9 pages.
EP Application No. 15176344.8, Extended European Search Report dated Dec. 1, 2015, 6 pages.
U.S. Appl. No. 14/328,804 Notice of Allowance dated Nov. 16, 2015, 14 pages.

* cited by examiner

BURST DISC PUNCTURE PRESSURE-IMBALANCE ACTUATOR FOR A FIRE EXTINGUISHER

BACKGROUND OF THE INVENTION

The subject matter disclosed herein relates to a fire extinguisher actuator. More specifically, the subject disclosure relates to a fire extinguisher actuator that punctures a burst disc and activates the release of a fire extinguishing agent by creating a pressure imbalance to drive a cutter through the burst disc.

In an aircraft environment, hermetically sealed fire extinguishers are typically activated by direct explosive impingement energy using a pyrotechnic trigger device, such as a pyrotechnic cartridge or squib. The impingement energy is focused on a dome-shaped burst disc such that the burst disc will rupture as a result of the impingement. The burst disc is typically fabricated from corrosion resistant steel. Normally, the pyrotechnic trigger device is retained in a discharge head in such a manner that it directly faces the burst disc. The discharge head is attached to an outlet of the fire extinguisher and is typically used to direct the flow of extinguishing agent to an aircraft interface, such as plumbing or tubing, which directs the extinguishing agent to a desired location. A filter screen is located within the discharge head to catch any large burst disc fragments created as a result of the explosive impingement energy.

The use of pyrotechnic trigger devices can be effective; however, pyrotechnic trigger devices require special handling procedures and training that add to overall aircraft management and maintenance costs. Additionally, pyrotechnic trigger devices may have a limited expected life span and thus require periodic replacement.

BRIEF DESCRIPTION OF THE INVENTION

According to one aspect, a fire extinguisher actuator assembly for a fire extinguisher is provided. The fire extinguisher includes a fire extinguisher reservoir and a burst disc that forms a discharge barrier between the fire extinguisher reservoir and a discharge head to retain a pressurized fire extinguishing agent within the fire extinguisher reservoir. The fire extinguisher actuator assembly includes a cutter shuttle assembly having a cutter coupled to a shuttle body. The cutter shuttle assembly is detained within the fire extinguisher proximate the burst disc and biased to form a pressure equalization region between the shuttle body and the burst disc. The fire extinguisher actuator assembly also includes an activation device having a piercing member. The activation device is operable to pierce the burst disc and release pressure from the pressure equalization region, thereby driving the cutter through the burst disc to release the pressurized fire extinguishing agent through the discharge head.

According to another aspect, a method of installing a fire extinguisher actuator assembly in a fire extinguisher is provided. The fire extinguisher includes a fire extinguisher reservoir and a burst disc that forms a discharge barrier between the fire extinguisher reservoir and a discharge head to retain a pressurized fire extinguishing agent within the fire extinguisher reservoir. The method includes detaining a cutter shuttle assembly that includes a cutter coupled to a shuttle body within the fire extinguisher proximate the burst disc and biased to form a pressure equalization region between the shuttle body and the burst disc. An activation device including a piercing member is positioned to pierce the burst disc and release pressure from the pressure equalization region, thereby driving the cutter through the burst disc to release the pressurized fire extinguishing agent through the discharge head in response to triggering of the activation device.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

In an exemplary embodiment, a fire extinguisher actuator assembly for a fire extinguisher is provided that is activated without a pyrotechnic trigger device. The fire extinguisher actuator assembly includes a two-part activation and release of a pressurized fire extinguishing agent using a non-pyrotechnic activation device in combination with a cutter shuttle assembly driven by a pressure differential. Using a cutter to rapidly open a burst disc of a fire extinguisher may remove the need to include a debris screen in a discharge head of the fire extinguisher system, as loose burst disc fragments typically resulting from pyrotechnic trigger device ignition are no longer present.

Figure 1:
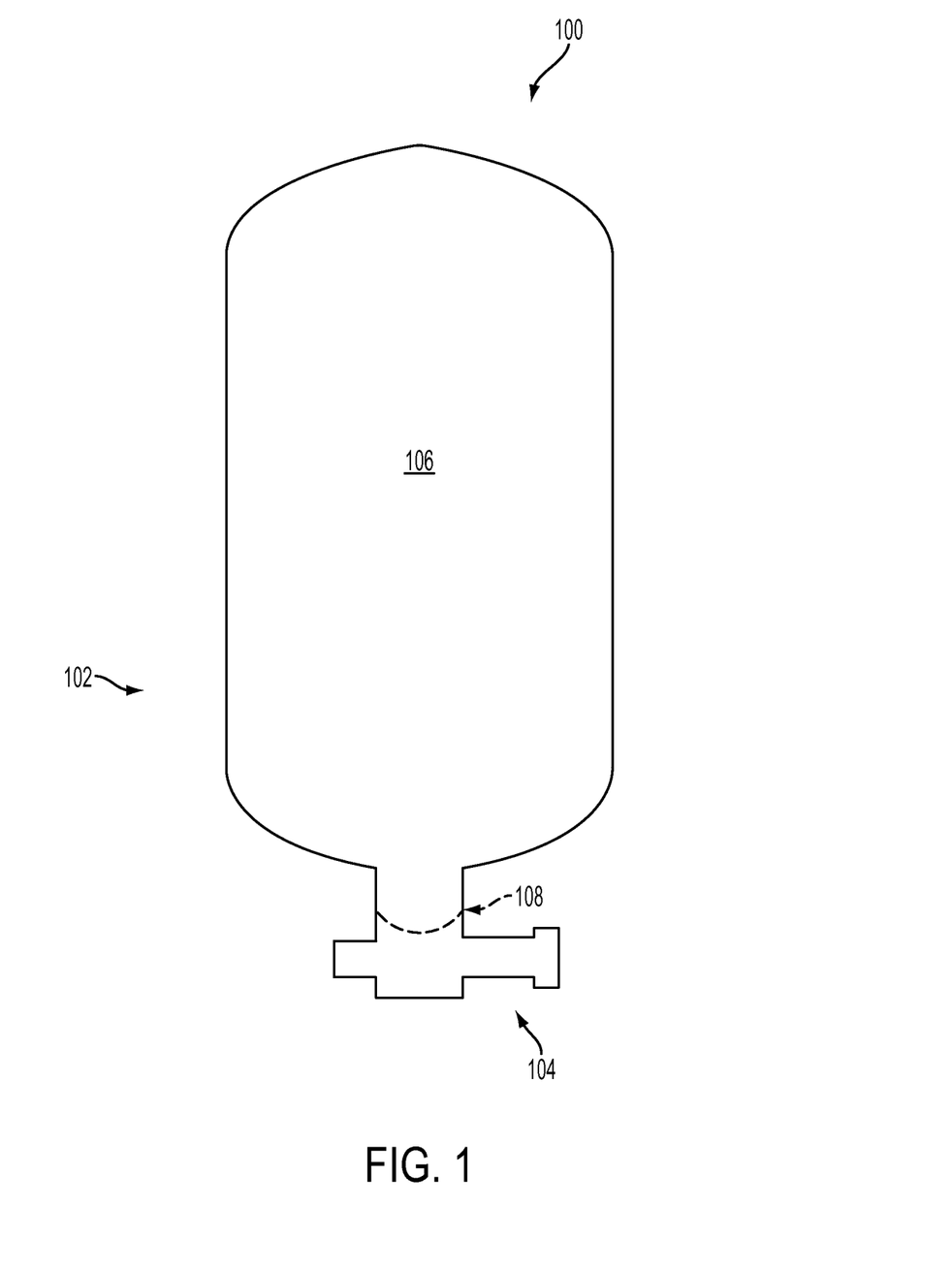
FIG. 1 is a schematic view of a fire extinguisher system according to an embodiment.

Turning now to FIG. 1, a schematic view of a fire extinguisher system 100 is depicted according to an embodiment. The fire extinguisher system 100 includes a fire extinguisher 102 and a discharge head 104. The fire extinguisher 102 includes a fire extinguisher reservoir 106 and a burst disc 108 that forms a discharge barrier between the fire extinguisher reservoir 106 and the discharge head 104 to retain a pressurized fire extinguishing agent within the fire extinguisher reservoir 106. The discharge head 104 can be interfaced to plumbing/tubing to direct fire extinguishing agent to a desired location, for example, within an aircraft.

Figure 2:
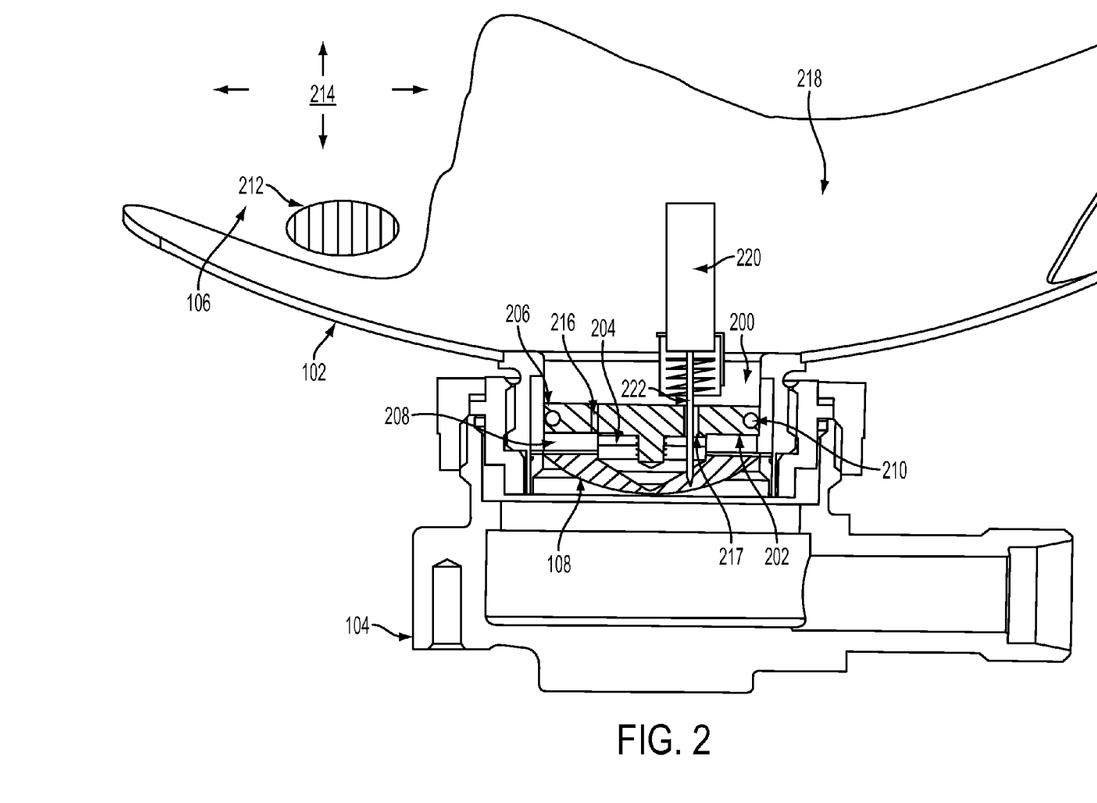
FIG. 2 is a detailed view of a fire extinguisher actuator assembly prior to activation according to an embodiment.

FIG. 2 is a detailed view of a fire extinguisher actuator assembly 200 prior to activation according to an embodiment. In the example of FIG. 2, the fire extinguisher actuator assembly 200 includes a cutter shuttle assembly 202 having a cutter 204 coupled to a shuttle body 206. The cutter shuttle assembly 202 is detained within the fire extinguisher 102 proximate the burst disc 108 and biased to form a pressure equalization region 208 between the shuttle body 206 and the burst disc 108. The cutter shuttle assembly 202 can be detained by a flexible seal 210 until pressure from the pressure equalization region 208 is released. Pressurized fire extinguishing agent 212 is held in the fire extinguisher reservoir 106 under internal fire extinguisher pressure 214. The shuttle body 206 includes at least one pressure equalization hole 216, 217 to establish an equilibrium pressure in the pressure equalization region 208 relative to a main interior region 218 of the fire extinguisher reservoir 106.

The fire extinguisher actuator assembly 200 also includes an activation device 220 having a piercing member 222 that is a pointed shaft used to rupture the burst disc 108. The activation device 220 is operable to pierce the burst disc 108 and release pressure from the pressure equalization region 208, thereby driving the cutter 204 through the burst disc 108 to release the pressurized fire extinguishing agent 212 through the discharge head 104. In the example of FIG. 2, pressure equalization hole 217 is sized for the piercing member 222 to pass through to pierce the burst disc 108. As can be seen in the FIG. 2, the activation device 220 can be installed in the fire extinguisher reservoir 106. The activation device 220 can be electrically driven, absent a pyrotechnic trigger device. For example, the activation device 220 can be a solenoid or other electro-mechanical device operable to drive the piercing member 222 through the burst disc 108. As the pressurized fire extinguishing agent 212 exits the pressure equalization region 208 upon piercing of the burst disc 108, the internal fire extinguisher pressure 214 overcomes the detaining force of the flexible seal 210 and drives the cutter shuttle assembly 202 toward the burst disc 108 where the cutter 204 cuts the burst disc 108 open to discharge the pressurized fire extinguishing agent 212 from the main interior region 218 of the fire extinguisher reservoir 106 out of the discharge head 104.

As will be understood, the fire extinguisher actuator assembly 200 can include other structure elements to support and stabilize the activation device 220, as well as electrical connections, which are not depicted to simplify the drawings. The fire extinguisher reservoir 106 can be sized to accommodate a wide variety of installations. For example, the fire extinguisher reservoir 106 can range in size from 40 cubic inches (655.5 cm$^3$) to 2,500+ cubic inches (40,968+ cm$^3$). Pressure changes within the fire extinguisher reservoir 106 can occur due to ambient temperature variations. For example, in an aircraft environment, the fire extinguisher 102 may be at 240 degrees F. (115.6 degrees C.) on the ground on a hot day and after takeoff be at −65 degrees F. (−53.9 degrees C.) at altitude. These temperature changes cause substantial changes to the internal fire extinguisher pressure 214. As changes occur to the internal fire extinguisher pressure 214, pressure equalization holes 216 and 217 permit the pressure with the fire extinguisher 102 to remain at an equilibrium pressure. Example nominal pressure values of the internal fire extinguisher pressure 214 can range from between about 300 pounds-per-square-inch (2,068 kPa) to about 800 pounds-per-square-inch (5,515 kPa) at 70 degrees F. (21.1 degrees C.), with higher pressures at higher temperatures and lower pressures at lower temperatures.

Figure 3:
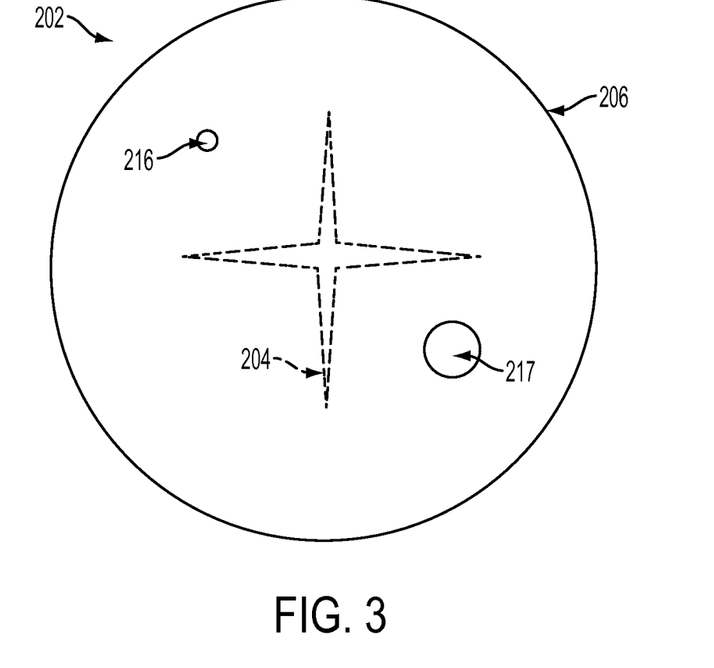
FIG. 3 is a top view of a cutter shuttle assembly according to an embodiment.

FIG. 3 is a top view of the cutter shuttle assembly 202 according to an embodiment. As can be seen in the example of FIG. 3, the shuttle body 206 includes two pressure equalization holes 216 and 217. The cutter 204 is disposed between the pressure equalization holes 216 and 217. Pressure equalization hole 217 is larger in diameter than the pressure equalization hole 216 to accommodate the piercing member 222 of FIG. 2 passing through it. The pressure equalization holes 216 and 217 are sized such that they cannot keep up with a rapid differential pressure change caused by the venting of the pressure in the pressure equalization region 208 of FIG. 2 below the shuttle body 206 into the discharge head 104 of FIG. 2 versus the internal fire extinguisher pressure 214 of FIG. 2.

Figure 4:
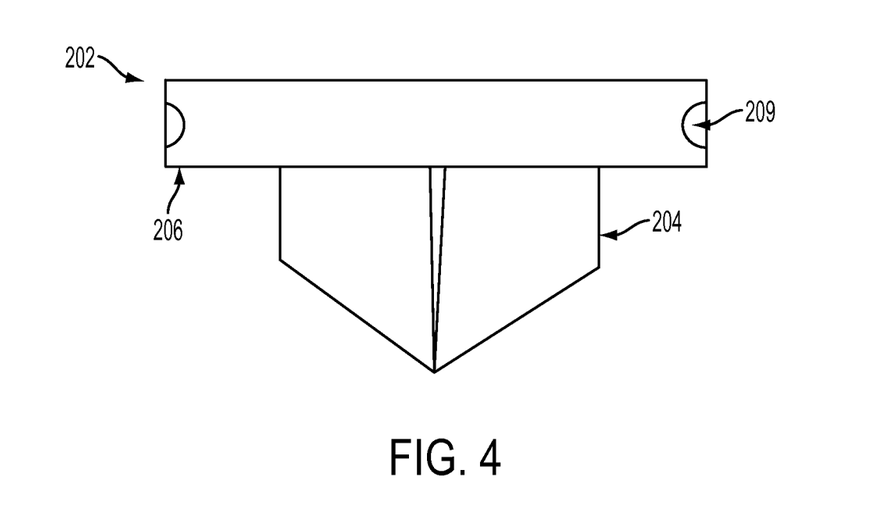
FIG. 4 is a side view of a cutter shuttle assembly according to an embodiment.

FIG. 4 is a side view of the cutter shuttle assembly 202 according to an embodiment. The shuttle body 206 includes a gland 209 around its circumference to hold the flexible seal 210 of FIG. 2, which serves as a detent to hold the cutter shuttle assembly 202 in place during shock and vibration such that the cutter 204 does not prematurely cut through the burst disc 108 of FIG. 1.

Figure 5:
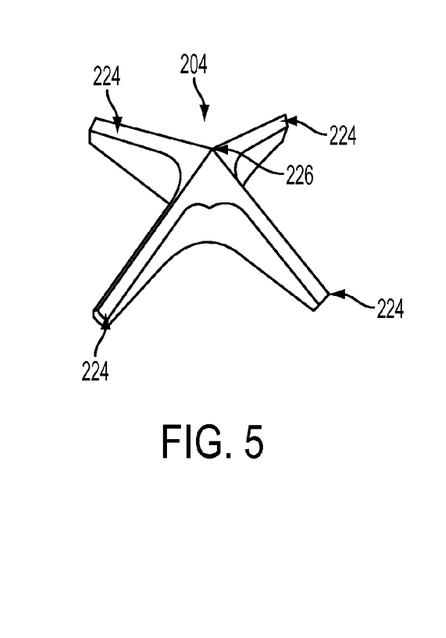
FIG. 5 is a perspective view of a cutter according to an embodiment.

FIG. 5 is a perspective view of the cutter 204 according to an embodiment. As can be seen in the example of FIG. 5, the cutter 204 includes four blades 224 intersecting at a central point 226 or cutting tip. The blades 224 may be uniformly spaced with about a 90 degree separation between the blades 224. The blades 224 may also be angled or sloped such that the central point 226 is a peak of the cutter 204.

Figure 6:
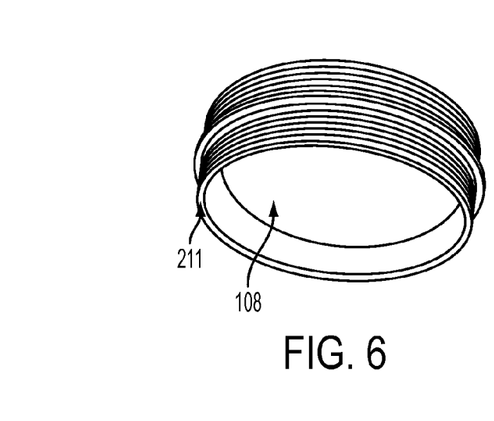
FIG. 6 is a perspective view of a burst disc prior to cutting according to an embodiment.
Figure 7:
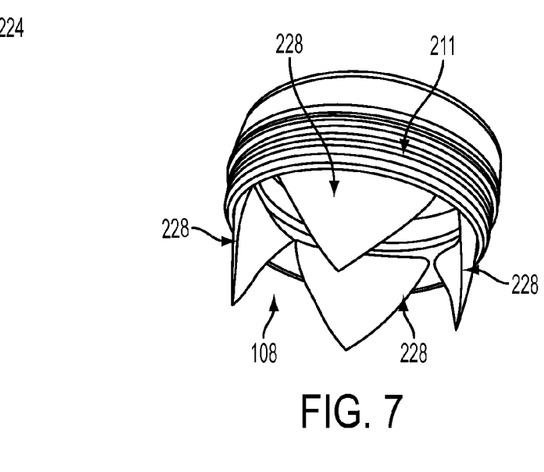
FIG. 7 is a perspective view of a burst disc after cutting according to an embodiment.

FIG. 6 is a perspective view of the burst disc 108 prior to cutting according to an embodiment. The burst disc 108 may be hermetically sealed by applying a weld to an outer perimeter of the burst disc 108 relative to a burst disc mounting assembly 211. FIG. 7 is a perspective view of the burst disc 108 after cutting according to an embodiment. When the cutter 204 of FIG. 2 is forced through the burst disc 108, the burst disc 108 splits and opens into a plurality of petals 228. The four blades 224 of FIG. 5 result in four petals 228. High pressure being released from the extinguisher reservoir 106 of FIG. 2 can rip the petals 228 fully open, while the hermetic sealing of the outer perimeter of the burst disc 108 retains the petals 228 to the burst disc mounting assembly 211.

Figures 8, 9:
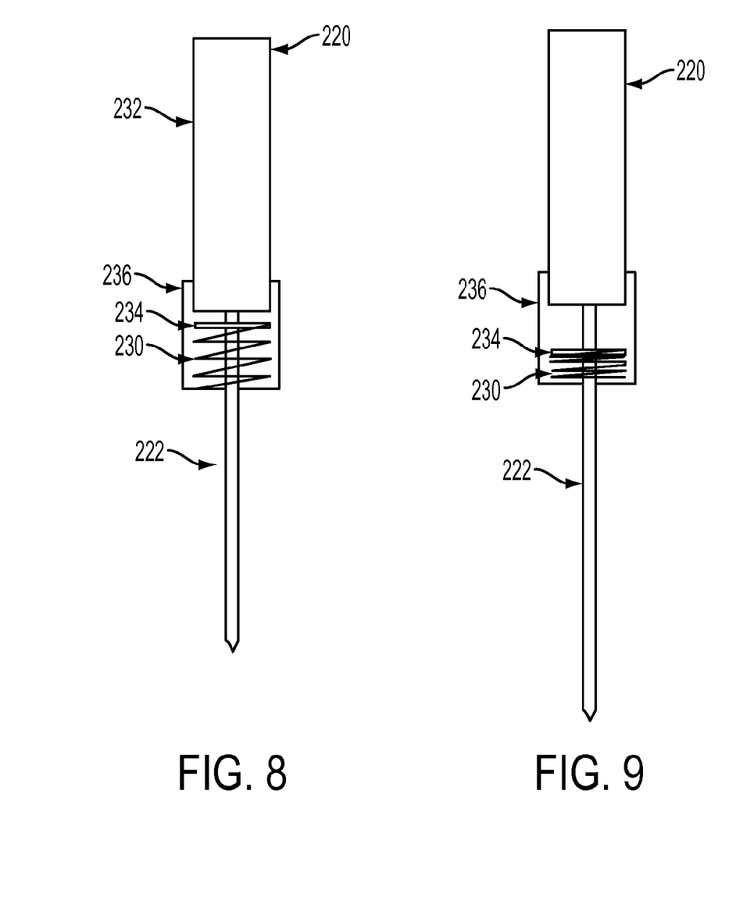
FIG. 8 is a schematic view of an activation device in a deactivated state according to an embodiment.
FIG. 9 is a schematic view of an activation device in an activated state according to an embodiment.

FIG. 8 is a schematic view of the activation device 220 in a deactivated state according to an embodiment. The activation device 220 can include a spring 230 to retract the piercing member 222 after the burst disc 108 of FIG. 2 is pierced. A linear actuator 232, such as an electrically-driven solenoid, can drive the piercing member 222 to an extended position in an activated state as depicted in FIG. 9. The spring 230 may be positioned between a rigid plate 234 coupled to the piercing member 222 and a base of a tubular shroud 236 surrounding the spring 230. The tubular shroud 236 is depicted in a cutaway view in FIGS. 8 and 9 to illustrate compression of the spring 230 in the activated state of FIG. 9. When electrical power is removed from the activation device 220, the spring 230 is no longer compressed, and the piercing member 222 returns to the deactivated state of FIG. 8. Electrical power need only be applied to the activation device 220 for a very short time, for example, 40-50 milliseconds, in order to pierce the burst disc 108 of FIG. 2.

Figure 10:
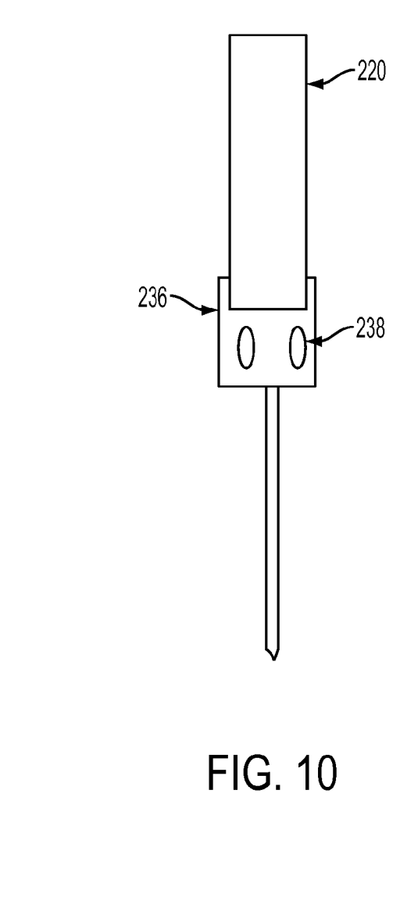
FIG. 10 is a schematic view depicting a tubular shroud of an activation device according to an embodiment.

FIG. 10 is a schematic view depicting the tubular shroud 236 of the activation device 220 according to an embodiment without a cutaway view. The tubular shroud 236 can include vent holes 238 to enable circulation of the pressurized fire extinguishing agent 212 of FIG. 2. The vent holes 238 can prevent resistance that would be caused by the rigid plate 234 moving downward to compress the spring 230 within the volume of the tubular shroud 236.

Figure 11:
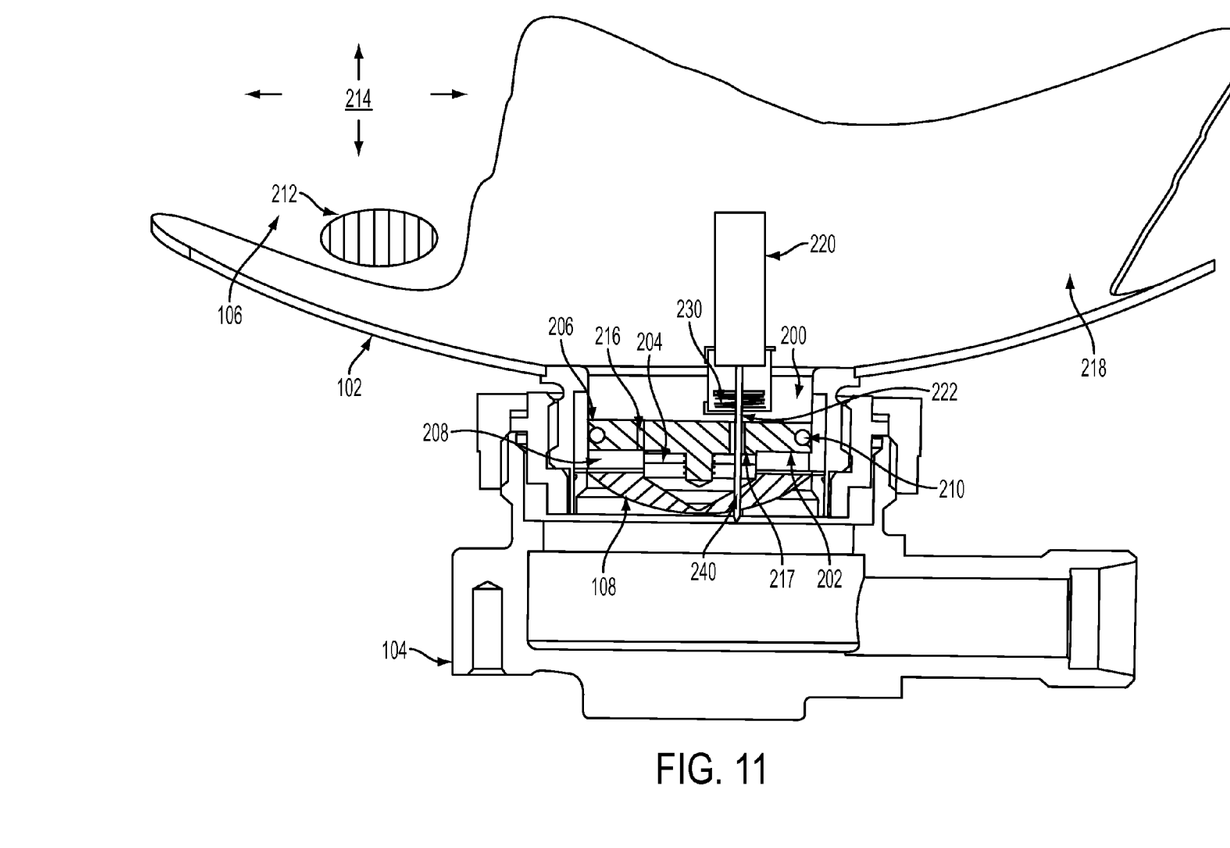
FIG. 11 is a detailed view of the fire extinguisher actuator assembly of FIG. 2 upon activation according to an embodiment.

FIG. 11 is a detailed view of the fire extinguisher actuator assembly 200 of FIG. 2 upon activation according to an embodiment. Upon sending an electrical signal to the activation device 220, the activation device 220 drives the piercing member 222 through the burst disc 108. Upon puncturing the burst disc 108, the piercing member 222 can be retracted, e.g., by the spring 230. A rupture hole 240 in the burst disc 108 will cause the pressure within the pressure equalization region 208 to very rapidly vent into the discharge head 104, as the discharge head 104 has approximately one atmosphere of ambient pressure. The venting of this pressure may occur in less than 1-2 milliseconds. As a result of the venting of the pressure in the pressure equalization region 208, the fire extinguisher 102 is no longer in equilibrium, and internal fire extinguisher pressure 214 in the main interior region 218 of the fire extinguisher reservoir 106 which is above the cutter shuttle assembly 202 will push on the cutter shuttle assembly 202, driving the cutter 204 into the burst disc 108. Not shown in FIG. 11, in order to simplify the drawings, is that the cutter shuttle assembly 202 will be restrained internally so it cannot become a projectile if the fire extinguisher 102 is inadvertently discharged while the discharge head 104 or other protective device are not in place at the time of the inadvertent discharge. The cutter shuttle assembly 202 will normally be retained in, and stopped by the discharge head 104 such that it does not become a projectile.

Figure 12:
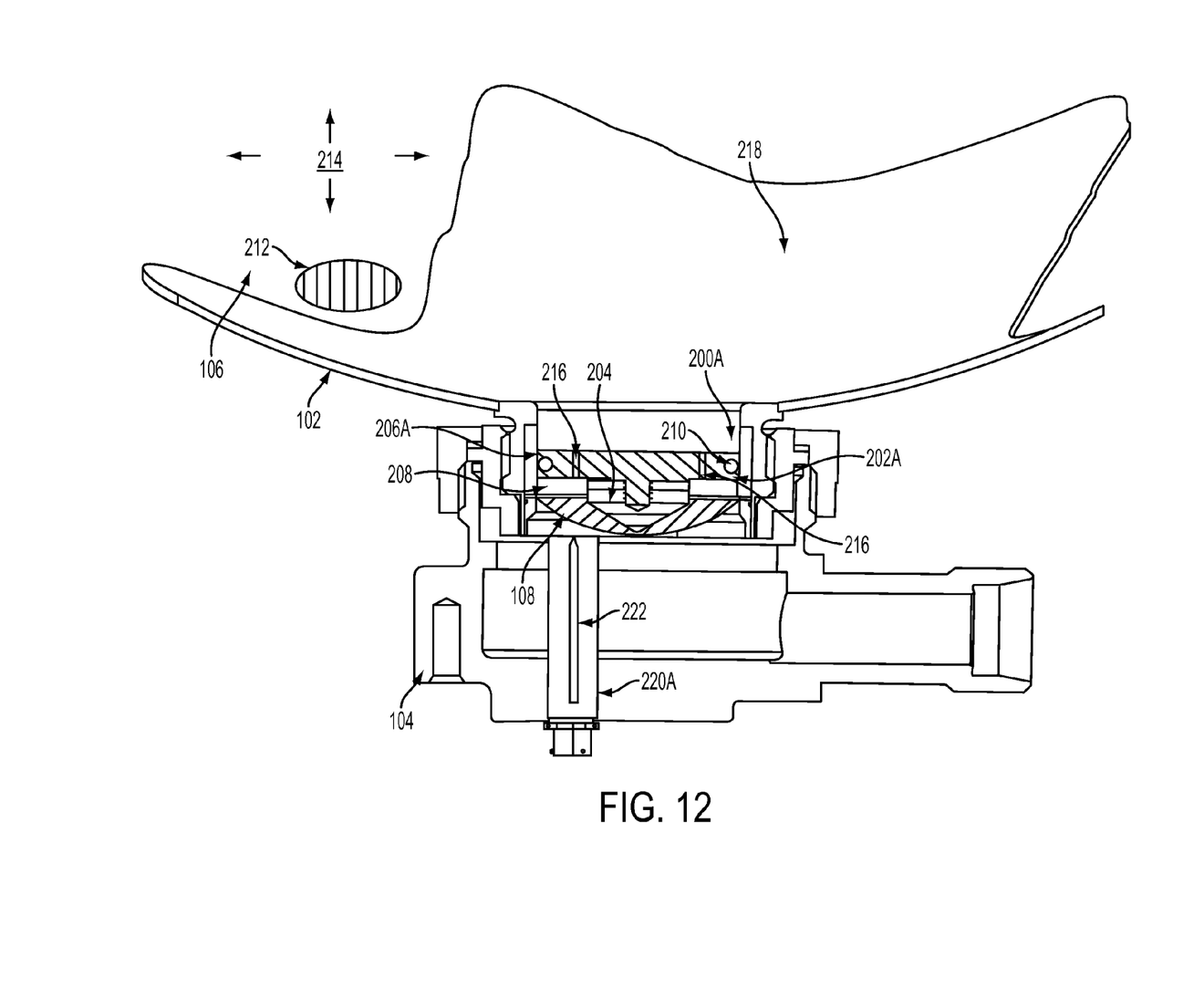
FIG. 12 is a detailed view of a fire extinguisher actuator assembly prior to activation according to an embodiment.

FIG. 12 is a detailed view of a fire extinguisher actuator assembly 200A prior to activation according to an embodiment. Similar to the embodiment of FIG. 2, the fire extinguisher actuator assembly 200A includes a cutter shuttle assembly 202A having a cutter 204 coupled to a shuttle body 206A. The cutter shuttle assembly 202A is detained within the fire extinguisher 102 proximate the burst disc 108 and biased to form a pressure equalization region 208 between the shuttle body 206A and the burst disc 108. The cutter shuttle assembly 202A can be detained by a flexible seal 210 until pressure from the pressure equalization region 208 is released. Pressurized fire extinguishing agent 212 is held in the fire extinguisher reservoir 106 under internal fire extinguisher pressure 214. The shuttle body 206A includes at least one pressure equalization hole 216 (two pressure equalization holes 216 in this example) to establish an equilibrium pressure in the pressure equalization region 208 relative to a main interior region 218 of the fire extinguisher reservoir 106. In the example of FIG. 12, there are two pressure equalization holes 216 but no larger diameter pressure equalization hole 217 as included in the embodiment of FIG. 2.

The fire extinguisher actuator assembly 200A also includes an activation device 220A having a piercing member 222A that is a pointed shaft used to rupture the burst disc 108. The activation device 220A is operable to pierce the burst disc 108 and release pressure from the pressure equalization region 208, thereby driving the cutter 204 through the burst disc 108 to release the pressurized fire extinguishing agent 212 through the discharge head 104. The activation device 220A is located in the discharge head 104 rather than within the fire extinguisher 102. The activation device 220A can be electrically driven, absent a pyrotechnic trigger device. For example, the activation device 220A can be a solenoid or other electro-mechanical device operable to drive the piercing member 222A through the burst disc 108. As the pressurized fire extinguishing agent 212 exits the pressure equalization region 208 upon piercing of the burst disc 108, the internal fire extinguisher pressure 214 overcomes the detaining force of the flexible seal 210 and drives the cutter shuttle assembly 202A toward the burst disc 108 where the cutter 204 cuts the burst disc 108 open to discharge pressurized fire extinguishing agent 212 from the main interior region 218 of the fire extinguisher reservoir 106 out of the discharge head 104.

Figure 13:
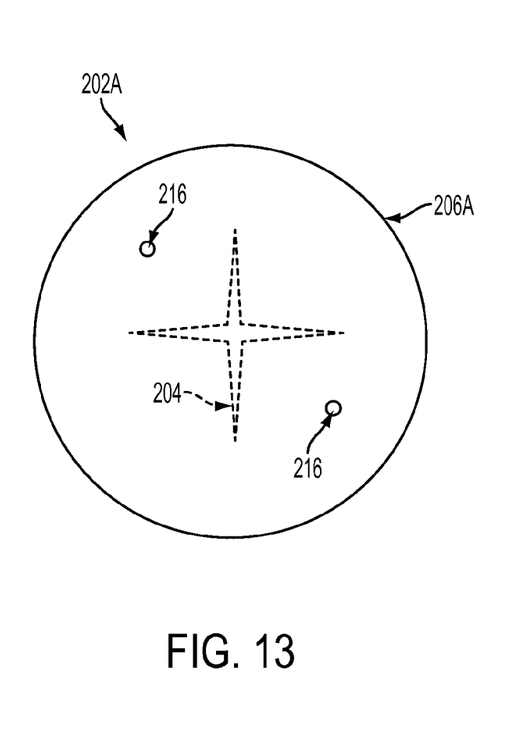
FIG. 13 is a top view of a cutter shuttle assembly according to an embodiment.

FIG. 13 is a top view of the cutter shuttle assembly 202A according to an embodiment. As can be seen in the example of FIG. 13, the shuttle body 206A includes two pressure equalization holes 216 that are substantially the same size. The cutter 204 is disposed between the pressure equalization holes 216. The pressure equalization holes 216 are sized such that they cannot keep up with a rapid differential pressure change caused by the venting of pressure in the pressure equalization region 208 of FIG. 12 below the shuttle body 206A into the discharge head 104 of FIG. 12 versus the internal fire extinguisher pressure 214 of FIG. 12.

Figure 14:
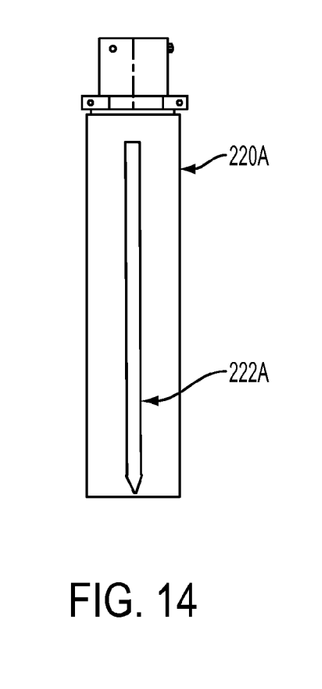
FIG. 14 is a schematic view of an activation device in a deactivated state according to an embodiment.
Figure 15:
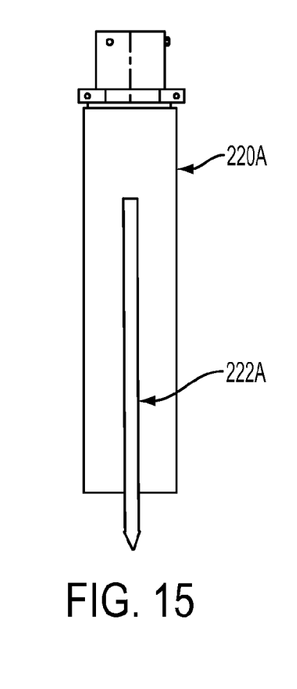
FIG. 15 is a schematic view of an activation device in an activated state according to an embodiment.

FIG. 14 is a schematic view of the activation device 220A in a deactivated state according to an embodiment, and FIG. 15 is a schematic view of the activation device 220A in an activated state according to an embodiment. As can be seen in FIGS. 14 and 15, triggering the activation device 220A results in the piercing member 222A extending outwardly.

Figure 16:
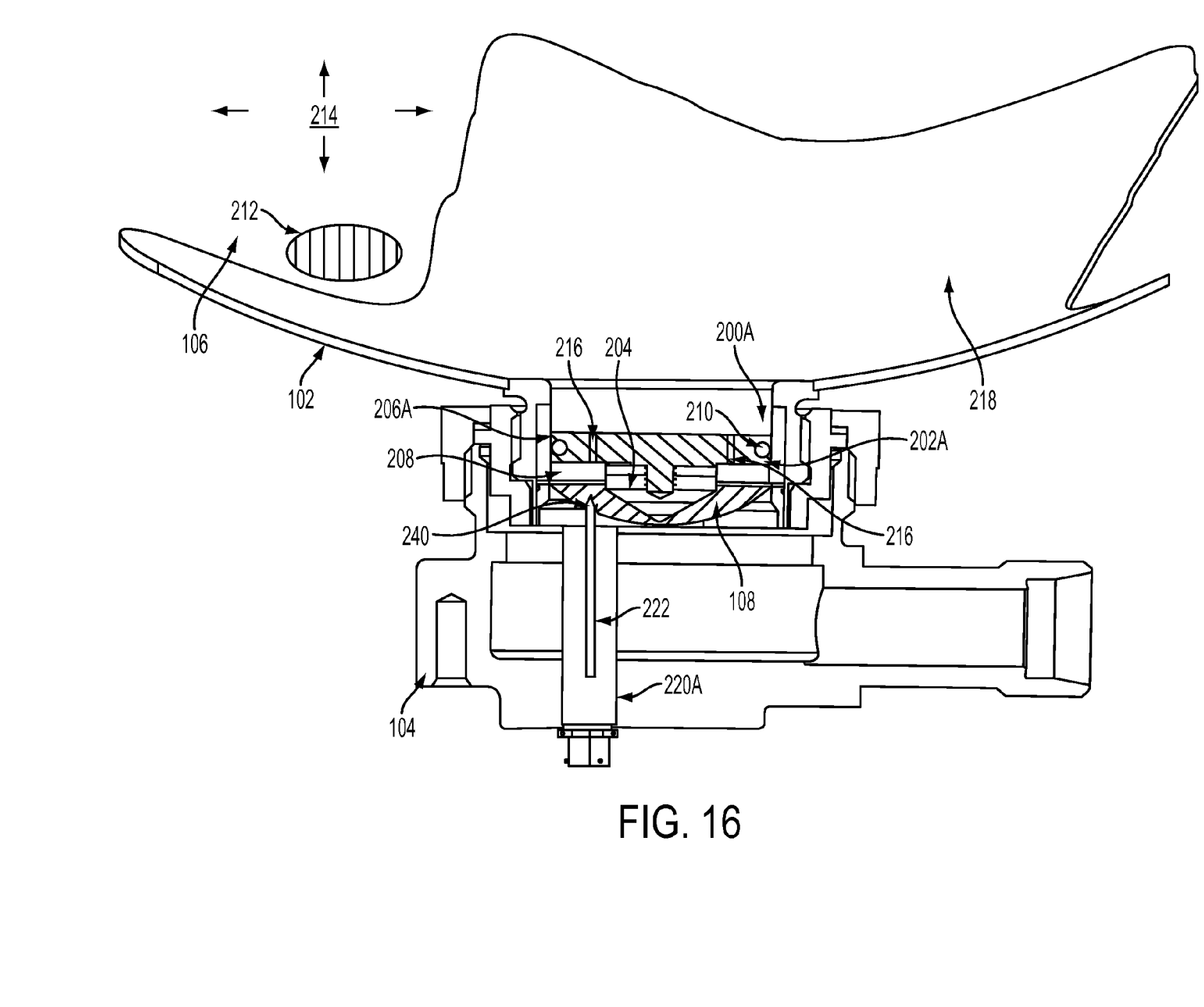
FIG. 16 is a detailed view of the fire extinguisher actuator assembly of FIG. 12 upon activation according to an embodiment.

FIG. 16 is a detailed view of the fire extinguisher actuator assembly 200A of FIG. 12 upon activation according to an embodiment. Upon sending an electrical signal to the activation device 220A, the activation device 220A drives the piercing member 222A through the burst disc 108. A rupture hole 240 in the burst disc 108 will cause the pressure within the pressure equalization region 208 to very rapidly vent into the discharge head 104. As a result of the venting of the pressure in the pressure equalization region 208, the fire extinguisher 102 is no longer in equilibrium, and internal fire extinguisher pressure 214 in the main interior region 218 of the fire extinguisher reservoir 106 which is above the cutter shuttle assembly 202A will push on the cutter shuttle assembly 202A, driving the cutter 204 into the burst disc 108. Not shown in FIG. 16, in order to simplify the drawings, is that the cutter shuttle assembly 202A will be restrained internally so it cannot become a projectile if the fire extinguisher 102 is inadvertently discharged while the discharge head 104 or other protective device are not in place at the time of the inadvertent discharge. The cutter shuttle assembly 202A will normally be retained in, and stopped by the discharge head 104 such that it does not become a projectile.

With reference to FIGS. 1-16, the fire extinguisher actuator assembly 200, 200A can be installed in a fire extinguisher 102 according to an installation method. As previously described, the fire extinguisher 102 includes a fire extinguisher reservoir 106 and a burst disc 108 that forms a discharge barrier between the fire extinguisher reservoir 106 and a discharge head 104 to retain a pressurized fire extinguishing agent 212 within the fire extinguisher reservoir 106. A cutter shuttle assembly 202, 202A that includes a cutter 204 coupled to a shuttle body 206, 206A within the fire extinguisher 102 proximate the burst disc 108 is detained and biased to form a pressure equalization region 208 between the shuttle body 206, 206A and the burst disc 108. An activation device 220, 220A including a piercing member 222, 222A is positioned to pierce the burst disc 108 and release pressure from the pressure equalization region 208, thereby driving the cutter 204 through the burst disc 108 to release the pressurized fire extinguishing agent 212 through the discharge head 104 in response to triggering of the activation device 220, 220A. The activation device 220 can be installed in the fire extinguisher reservoir 106, and the piercing member 222 may be positioned to pass through a pressure equalization hole 217 to pierce the burst disc 108. Alternatively, the activation device 220A can be installed in the discharge head 104. The activation devices 220 and 220A can be electrically driven, absent a pyrotechnic trigger device.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fire extinguisher actuator assembly for a fire extinguisher, the fire extinguisher comprising a fire extinguisher reservoir and a burst disc that forms a discharge barrier between the fire extinguisher reservoir and a discharge head to retain a pressurized fire extinguishing agent within the fire extinguisher reservoir, the fire extinguisher actuator assembly comprising:
   a cutter shuttle assembly comprising a cutter coupled to a shuttle body, the cutter shuttle assembly detained within the fire extinguisher proximate the burst disc and biased to form a pressure equalization region between the shuttle body and the burst disc; and
   an activation device comprising a piercing member, the activation device operable to drive the piercing member through the burst disc and release the pressurized fire extinguishing agent from within the pressure equalization region prior to movement of the cutter shuttle assembly, wherein the release of the pressurized fire extinguishing agent from within the pressure equalization region drives the cutter shuttle assembly towards the burst disc and the cutter through the burst disc to release the pressurized fire extinguishing agent from the fire extinguisher reservoir through the discharge head.

2. The fire extinguisher actuator assembly of claim 1, wherein the shuttle body comprises at least one pressure equalization hole to establish an equilibrium pressure in the pressure equalization region relative to a main interior region of the fire extinguisher reservoir.

3. The fire extinguisher actuator assembly of claim 2, wherein one of the at least one pressure equalization holes is sized for the piercing member to pass through to pierce the burst disc.

4. The fire extinguisher actuator assembly of claim 1, wherein the activation device further comprises a spring to retract the piercing member after the burst disc is pierced.

5. The fire extinguisher actuator assembly of claim 4, wherein the spring is positioned between a rigid plate coupled to the piercing member and a base of a tubular shroud surrounding the spring, the tubular shroud comprising vent holes to enable circulation of the pressurized fire extinguishing agent.

6. The fire extinguisher actuator assembly of claim 1, wherein the cutter shuttle assembly is detained by a flexible seal until the release of the pressurized fire extinguishing agent from within the pressure equalization region.

7. The fire extinguisher actuator assembly of claim 1, wherein the activation device is installed in the fire extinguisher reservoir.

8. The fire extinguisher actuator assembly of claim 1, wherein the activation device is installed in the discharge head.

9. The fire extinguisher actuator assembly of claim 1, wherein the burst disc is hermetically sealed.

10. The fire extinguisher actuator assembly of claim 1, wherein the cutter comprises four blades intersecting at a central point.

11. The fire extinguisher actuator assembly of claim 1, wherein the activation device is electrically driven absent a pyrotechnic trigger device.

12. A method of installing a fire extinguisher actuator assembly in a fire extinguisher, the fire extinguisher comprising a fire extinguisher reservoir and a burst disc that forms a discharge barrier between the fire extinguisher reservoir and a discharge head to retain a pressurized fire extinguishing agent within the fire extinguisher reservoir, the method comprising:
   detaining a cutter shuttle assembly comprising a cutter coupled to a shuttle body within the fire extinguisher proximate the burst disc and biased to form a pressure equalization region between the shuttle body and the burst disc; and
   positioning an activation device comprising a piercing member to drive the piercing member through the burst disc and release the pressurized fire extinguishing agent from within the pressure equalization region prior to movement of the cutter shuttle assembly, wherein the release of the pressurized fire extinguishing agent from within the pressure equalization region drives the cutter shuttle assembly towards the burst disc and the cutter through the burst disc to release the pressurized fire extinguishing agent from the fire extinguisher reservoir through the discharge head in response to triggering of the activation device.

13. The method of claim 12, wherein the activation device is installed in the fire extinguisher reservoir and the piercing member is positioned to pass through a pressure equalization hole to pierce the burst disc.

14. The method of claim 12, wherein the activation device is installed in the discharge head.

15. The method of claim 12, wherein the activation device is electrically driven absent a pyrotechnic trigger device.

* * * * *